March 17, 1959 G. BOHATY 2,878,142
PRESSURE-SENSITIVE TAPES AND METHOD FOR MANUFACTURING SAME
Filed June 23, 1955
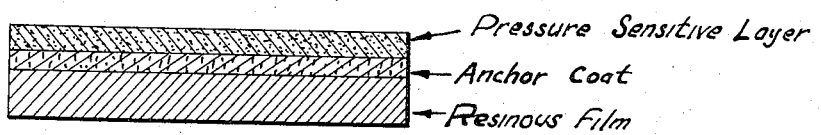
INVENTOR.
GENE BOHATY

United States Patent Office 2,878,142
Patented Mar. 17, 1959

2,878,142

PRESSURE-SENSITIVE TAPES AND METHOD FOR MANUFACTURING SAME

Gene Bohaty, Chicago, Ill., assignor, by mesne assignments, to Mystik Adhesive Products, Inc., a corporation of Illinois Application June 23, 1955, Serial No. 517,649

15 Claims. (Cl. 117—76)

This invention relates to the manufacture of a pressure-sensitive adhesive tape, and it relates more particularly to a pressure-sensitive adhesive tape of the type described capable of use under widely varying atmospheric conditions for purposes of electrical insulation and the like, wherein it is desirable to make use of relatively inert materials which are stable under temperature conditions ranging from extremely low temperatures in the order of —60 to —70° F. to relatively high temperatures in excess of 150° F., and it is an object of this invention to produce an adhesive tape of the type described and to provide a method and compositions for use in the manufacture of same.

Another object is to produce a pressure-sensitive adhesive tape of the type described which has improved performance characteristics with reference to its use as an insulation material under widely varying atmospheric conditions; which has improved processing characteristics with respect to the ease of manufacture thereof; which is formed of relatively inert film stock having high strength, flexibility, and resiliency desirable for use as an electrical insulaiton material and to resist deterioration under conditions of use without loss in the desirable properties thereof at low or high temperatures; which makes use of a pressure-sensitive adhesive capable of functioning in combination with the film to provide good insulation characteristics and which retains its adhesiveness and flexibility under widely varying conditions of use ranging from extremely low temperatures to relatively high temperatures; which is easily and efficiently manufactured of readily available materials into a tape in which the pressure-sensitive adhesive preferentially bonds to one face of the film so as to enable the coated film stock to be rolled into a compact package for dispensing without the need of a separator between layers; and which has good shelf life for use without limitation with respect to the conditions and time of storage.

These and other objects and advantages of this invention will hereinafter appear and for purposes of illustration, but not of limitation, an embodiment of the invention is shown in the accompanying drawing of which the figure is a sectional view through the pressure sensitive adhesive tape embodying the features of this invention.

To the present, in the manufacture of pressure-sensitive adhesive tapes, use has been made of a backing sheet having a pressure-sensitive adhesive applied to one face thereof in which the pressure-sensitive adhesive is usually formulated of a rubber-resin system such as resins and resin esters in combination with an elastomer of the type which includes natural rubber or synthetic elastomers. The backing sheet may be selected of a fabric such as a woven cotton textile material, but it is preferred that use be made of a film formed of a synthetic resinous material such as polyvinyl chloride, vinyl chloride-vinyl acetate copolymer, nitrocellulose, a regenerated cellulose, cellulose acetate, cellulose propionate-butyrate, polyvinylidene chloride, and the like, in which the films are usually of a thickness ranging from a few mils up to about 10 to 20 mils. Instead, the backing sheet may be formed of paper or other non-woven fabrics of interbonding fibers or of films of metal such as aluminum, iron, tin, lead, and the like. In manufacturing, the backing sheets are coated with the pressure-sensitive adhesive and then cut into strips of the desired width for rolling up into a compact package for dispensing.

While such pressure-sensitive adhesive tapes find excellent use in a large number of applications, it has been found that materials which have been used for backing strips and the rubber-resin systems which have been used for the pressure-sensitive adhesives, are not sufficiently inert to enable use of the tape in applications where good electrical insulation characteristics are required. It has been found further that the pressure-sensitive adhesive tape becomes embrittled and incapable of development of the bonding relationship desired when the tape is employed in applications having temperatures below 0° C. or above 100° F.

It has been found that the desired inertness for use as an insulation material, and that the desired stability under widely varying atmospheric conditions, are available from relatively few film-forming materials. Of the large number of film-forming resins available, the desired combination of inertness, flexibility, and stability appears to be limited, for the present, to film stock formed of polyethylene and polyethylene derivatives such as polyethylene terephthalate (Mylar, manufactured by the E. I. du Pont Company) and polytetrafluoroethylene (Teflon, manufactured by the E. I. du Pont Company). These resinous materials are capable of forming highly flexible, inert films which retain their flexibility and strength and inertness at temperatures as low as —60° F. and above 300° F. without deterioration of their high electrical insulating properties.

A similar problem exists with respect to the pressure-sensitive adhesive since rubber-resin systems become embrittled and lose their adhesiveness at low temperature and the cohesive strength is reduced when used at temperatures much above room temperature. It is preferred to make use of a pressure-sensitive adhesive which is relatively insensitive to temperature change, which is relatively inert, and which has good insulating characteristics for use in combination with the film stock of polyethylene and derivatives, such as polyethylene terephthalate or fluorinated polyethylene, as represented by tetrafluoroethylene.

Pressure-sensitive adhesives having the desired inertness and temperature stability have been formulated of organosilicon polymers believed to be composed chiefly of methylpolysiloxane, in which the number of hydrolyzable groups in the silane are sufficient upon polymerization by condensation to form an elastomer which has adhesive properties upon cure. An organosilicon polymer capable of use in the practice of this invention as a pressure-sensitive adhesive is being marketed at the present time by the Dow Corning Corporation of Midland, Michigan, under the trade name "XC-269."

The pressure-sensitive organosilicon adhesive has been applied as the adhesive layer onto film stock formed of polyethylene, polyethylene terephthalate, and polytetrafluoroethylene, but the adhesive tape that is formed has been found to be unsatisfactory because the cohesiveness of the adhesive is greater than its adhesiveness for the resinous film, with the result that the bonding relation of the film and the pressure-sensitive organosilicon adhesive is insufficient to prevent separation. It is believed that the inertness of the polyethylene and the polyethylene derivative resins, coupled with the relatively smooth surface made available on the film in forming, prevents the utilization of physical forces for development of a strong bonding relationship, such as is available in the use of backing sheets having surface roughness or porosity, as in sheets formed of paper, textile material woven of cotton or cellulose fibers, or such as is available in film stock formed of resinous materials which are readily attacked by the system of the pressure-sensitive adhesive for attachment.

In the absence of physical forces, reliance must be had on chemical forces or ionic forces for attachment. Because of the basic differences between the organic groups in the polymer of the synthetic film-forming resinous material as compared to the inorganic silicon oxide linkages of the pressure-sensitive adhesive, attraction through chemical forces does not appear to provide a sufficient bonding relationship between the applied adhesive and the resinous film forming the backing sheet.

Attempts have been made to formulate an anchoring agent for application to the surfaces of the resinous film formed of polyethylene or polyethylene derivatives in the attempt to modify the surface characteristics thereof for rendering the surface more receptive to the applied pressure-sensitive organosilicon polymer. For this purpose, investigations have been conducted in the use of a butadieneacrylonitrile copolymer, alone or in combination with a phenol formaldehyde resin, as an anchoring agent applied as a thin film onto the resinous backing sheet to improve the bonding relationship between the organosilicon adhesive and the film of polyethylene. To a limited extent, the anchorage of the adhesive to the surface of the film is improved, but not sufficiently to permit the strips of tape to be rolled into a compact package without separation of the adhesive from the face of the film when unrolled for use.

The search for a suitable anchoring agent for use in the development of a strong bonding relationship between the pressure-sensitive organosilicon polymer and the films of polyethylene and polyethylene derivatives has remained the subject matter of continued investigations. Numerous combinations have been formulated of the many resinous materials and other agents heretofore employed to improve the adhesiveness of organosilicon compounds to various surfaces, but for one reason or another conventional resinous materials and combinations thereof have failed either from the lack of a preferential attraction to the polyethylene or because of a lack of attraction between the anchoring agent and the organosilicon pressure-sensitive adhesive.

Having failed to achieve the desired results by conventional practices, applicant has departed from accepted practice and attempted to combine materials heretofore believed to be incompatible one with the other, by the combination of the organosilicon polymer with the butadieneacrylonitrile copolymer in a single system for application as an anchoring agent to the film of polyethylene or polyethylene derivative. Contrary to the normal expectations, the unlike materials did not separate one from the other in the treating composition. Instead, the materials combined to form a relatively stable system when formulated in the proportions which will hereinafter be defined, perhaps because of the presence of substantial amounts of coal tar resins such as a coumarone-indene resin, alone or in combination with a polyterpene resin or other coal tar derivative resin which appears to enhance the tolerance of one material for the other, or perhaps because of the presence of a common solvent such as toluene, xylene, benzene, and the like, which are miscible with the solvent for the butadiene-acrylonitrile copolymers and in which the organosilicon compound is soluble.

The coating composition applied in small amounts to the surfaces of the film stock remains strongly adherent to the surface of the resinous film, probably by reason of the presence of the butadiene-acrylonitrile polymer and the coal tar resins, while the modified surface of the film was highly receptive and readily wet out by the organosilicon pressure-sensitive adhesive, perhaps by anchorage through the organosilicon polymer in the anchoring agent.

In any event, a strong bonding relationship is developed between the elements, especially after the composite structure is heated to advance organo-silicon compound applied as the adhesive onto the surface of modified film.

It has been found important in the practice of this invention to maintain a predetermined ratio of the butadiene-acrylonitrile copolymer to the organo-silicon pressure-sensitive adhesive resin, and also to maintain a predetermined ratio of the butadiene-acrylonitrile copolymer to the coal tar resins in the system for development of the desired results. While the concentration of the ingredients in the treating composition may be varied, depending upon the viscosity characteristics desired, the manner of application of the treating composition, and the type of film upon which the composition is employed, the materials formulated into the composition should be maintained within the ratio of 1 part by weight of the elastomer including the butadiene-acrylonitrile copolymer and the butadiene-styrene copolymer, when present, to 0.5–2.0 parts by weight of the pressure-sensitive organosilicon compound when calculated on the solids basis. It is preferred to make use of about equal parts by weight of the two materials, plus or minus 20%. The cold tar resins, including coumarone-indene resins, alone or in combination with the polyterpenes and polyterpene derivative resins, such as the Piccolyte, manufactured by the Pennsylvania Industrial Chemical Corporation, should be present in the ratio of 1 part by weight of the elastomers to 0.2–1.0 part by weight of the total amount of cold tar resins or derivatives thereof. It is preferred to make use of an amount of the cold tar resins which is slightly more than one-half of the weight of the elastomer in the composition, and it is also preferred to make use of a combination of cold tar resins, including coumarone-indene resin and a polyterpene resin, wherein the amount of coumarone-indene resin is present in substantially larger proportions than the polyterpene resin.

As the amount of organosilicon resin to the elastomer is increased, the bonding relation of the anchoring agent to the polyethylene film decreases until unsatisfactory adhesion results when the elastomer is present in amounts less than one-half of the weight of the organosilicon compound. On the other hand, increase in the ratio of elastomer to the organosilicon resin decreases the receptivity of the pressure-sensitive organosilicon polymer until unsatisfactory adhesion results when the amount of elastomer is more than double the amount of organosilicon in the composition of the anchoring agent.

As the elastomer, use can be made of a butadiene-acrylonitrile copolymer in which the amount of acrylonitrile is 15 to 35% by weight of the copolymer, such as represented by the elastomer Hycar 15 and Hycar 25 manufactured by the B. F. Goodrich Chemical Company. It is preferred, however, to make use of a mixture of the butadiene-acrylonitrile copolymer with a butadiene-styrene copolymer in which the amount of butadiene-styrene copolymer is present in amounts less than that of the butadiene-acrylonitrile copolymer down to a complete absence of the former. When present, best use is made of the butadiene-styrene copolymer in the ratio of 1 part by weight butadiene-acrylonitrile copolymer to 0.2–0.5 part by weight of the butadiene-styrene copolymer. As used herein, the term "elastomer" is meant to include butadiene-acrylonitrile alone or in combination with a butadiene-styrene copolymer.

While improved results are secured by the use of the anchoring composition in which the coal tar resins are absent, an improved bonding relationship is established by the presence of such materials in the composition. As the coal tar resins, use can be made of coumarone-indene resins, polyterpene resins, and derivatives of the polyterpene resins and the like. Use can be made of the coumarone-indene resin alone. Where low temperature adhesion and flexibility are desired, it is preferred to make use of the combination of the coumarone-indene resin in combination with a polyterpene or Piccolyte resin wherein the latter is present in amounts less than the former.

In formulation, it is necessary to make use of a solvent system containing a component which is a good solvent for the elastomer but in which the major component is a solvent compatible with the elastomer solvent and in which the organosilicon polymer is soluble. It is believed that the common solvent plays an important part in maintaining the stability of the treating composition for enabling use on commercial equipment in the deposition of a uniform thin coating on the surfaces of the resinous film. Suitable solvent systems include nitropropane as the solvent for the elastomer and toluene as the diluent compatible with nitropropane, and in which the organosilicon polymer is capable of being held in a stable system; nitropropane (elastomer solvent) and methyl ethyl ketone (diluent); ethylene dichloride (elastomer solvent) and methyl ethyl ketone (diluent); nitroethane or nitromethane (elastomer solvent, 10 to 30 parts) and benzene, toluene, xylene (diluent, 90 to 70 parts); chlorotoluene or chlorobenzene (elastomer solvent, 10 to 30 parts) and benzene, toluene, xylene (diluent, 90 to 70 parts); chlorotoluene (elastomer solvent, 10 to 30 parts) and diisopropyl ketone (diluent, 90 to 70 parts); chlorotoluene, 10 to 20 parts, and nitroethane, 10 to 20 parts (elastomer solvent) and benzene (diluent, 80 to 60 parts); ethylene dichloride, 10 to 20 parts, chlorobenzene, 10 to 20 parts (elastomer solvent) and methyl ethyl ketone, 80 to 60 parts (diluent) and toluene, 10 parts, and benzene, 80 parts (diluent).

When an opaque coating is desired, fillers such as titanium dioxide, zinc oxide, calcium carbonate, silica, diatomaceous earth, and the like, may be incorporated in the composition in suitable amounts such as from 10 to 30% by weight of the coating composition when calculated on the solids basis.

The following will represent the practice of this invention in the formulation and application of an anchoring coat to the surface of a film of polyethylene terephthalate having a thickness of 0.5–10 mils to prepare the film for application of a pressure-sensitive organosilicon adhesive of the type XC–269, manufactured by the Dow-Corning Corporation.

EXAMPLE I

Composition:
 10 parts by weight butadiene-acrylonitrile (Hycar 1042, manufactured by the B. F. Goodrich Chemical Company)
 2.0 parts by weight butadiene-styrene copolymer
 15 parts by weight organosilicon pressure-sensitive adhesive (SC–269, manufactured by Dow-Corning Corporation)
 3.0 parts by weight polyterpene resin (Piccolyte S–85)
 5.0 parts by weight coumarone-indene resin
 0.75 part by weight hydrated aluminum oxide
 50 parts by weight toluene
 9 parts by weight nitropropane

*Procedure*

The elastomeric components, including the butadiene-acrylonitrile copolymer and the butadiene-styrene copolymer, are milled together and then taken into solution with the nitropropane and a part with toluene. The coumarone-indene resin and the polyterpene resin may be combined with the elastomers before milling but, in the preferred practice, they are added to the solution of the milled elastomers.

In a container separate and apart from the solution of milled elastomer and resins, the organosilicon polymer resin is taken into solution with the remainder of the toluene after the hydrated aluminum oxide has been milled into the solvent. A small amount of accelerator for more rapid cure of the organosilicon resinous polymer, such as benzoyl peroxide, is incorporated in with the organosilicon resinous solution before admixture with the elastomer resin system, or else the accelerator may be incorporated immediately prior to the use of the anchor coating composition onto the film of the polyethylene or polyethylene derivative.

The two separate compositions are then blended together by introducing the organosilicon polymer resin system into the solution of the milled elastomer and resin with stirring. A smooth and milky composition is formed which remains relatively stable over extended periods of time necessary for use.

The coating composition is applied onto the surface of the film of polyethylene or polyethylene derivative in coating weights of 8–16 pounds per ream and preferably in coating weights of about 12 pounds per ream. Application of the coating composition may be made by conventional means, such as by a knife coater, brush coater, roller coater or air doctor.

After the composition has been applied uniformly over the surfaces of the film in the desired weights, the film preferably in the form of an endless strip is led through a drying oven maintained at a temperature of about 140–180° F. until the coating on the surface is dry. Usually a time ranging from 1–5 minutes is required under the temperature conditions described.

After the anchored coat has been dried, the film need not be coated immediately but it is preferred to apply the coating as a continuous operation to form the finished pressure-sensitive adhesive tape by application of a pressure-sensitive adhesive as a top coat. For such purpose, use is made of the aforementioned pressure-sensitive organosilicon resinous adhesive (XC–269) diluted to a suitable consistency with solvent or aqueous medium for dispersion for application, as by means of a roller coater, knife coater, brush coater, air doctor or the like onto the treated polyethylene film. The pressure-sensitive adhesive having an organosilicon resinous base is applied as a top coat in weights of 20–40 pounds per ream and preferably about 30 pounds per ream. The pressure-sensitive adhesive, applied as a top coat, may have a pigment, such as titanium dioxide, zinc oxide, silicon oxide, calcium carbonate or the like incorporated therewith in amounts up to 50 percent by weight of the resin, and use is made of an accelerator, such as benzoyl peroxide, in amounts ranging from 0.1–2.0% by weight of the resin to aid in the cure of the organosilicon. It is preferred to incorporate the accelerator into the coating composition immediately prior to the use thereof in forming the top coat, but it is possible to formulate the top coat with the accelerator incorporated during formulation but lesser amounts of accelerator are desired for maintaining stability.

When the top coat has been applied, the film having the composite coatings on the surface thereof is advanced continuously through a drying oven heated to a temperature of 140–200° F. and then through a curing oven heated to a temperature of about 225–350° F. A cure of from 1–5 minutes at 300° F. is suitable, and the time for a cure may increase or decrease reversely in proportion to the deviation in temperature. It will be understood that the time and temperature conditions may be varied as long as the temperature employed does not exceed the decomposition temperature for any of the elements in the composite structure and as long as the temperature is kept sufficiently high to effect cure of the organosilicon in a reasonable time for continuous operation.

The coated film can thereafter be slitted by conventional means and wound up on cores in convenient length for distribution and sale. The tape that is formed is highly resistant to deterioration, as exhibited by an aging test at 140° F. The dielectric strength of the material is far superior to any other tape which has heretofore been made commercially available. The tape is highly resistant to electrolytic corrosion and its adhesiveness and pressure sensitivity remains substantially uniform over extremely wide temperature ranges, such as from a temperature above 300° F. to below —50° F.

The following will illustrate further modifications in the formulation of anchoring coats which may be used as described in the practice of this invention.

EXAMPLE II 10.0 parts by weight butadiene-acrylonitrile (Hycar OR–15)
4.0 parts by weight butadiene-styrene copolymer
16.0 parts by weight pressure-sensitive organo-silicon polymer resin (XC–269)
6.0 parts by weight coumarone-indene resin
2.0 parts by weight polyterpene
6.0 parts by weight titanium dioxide
1.0 part by weight hydrated aluminum oxide
15.0 parts by weight chlorotoluene
60.0 parts by weight toluene When a pigment such as titanium dioxide is employed in the formulation of the anchoring coat, the pigment is incorporated with the elastomers milled between rolls prior to taking the elastomer into solution. Otherwise, the procedure for preparation of the anchoring coating composition is similar to that described in Example I.

EXAMPLE III 16.0 parts by weight butadiene-acrylonitrile copolymer (Hycar OR–25)
16.0 parts by weight pressure-sensitive organo-silicon polymer resin (XC–269)
8.0 parts by weight coumarone-indene resin
10.0 parts by weight ethylene dichloride
10.0 parts by weight chlorotoluene
60.0 parts by weight xylene In the above formulation, the ethylene dichloride, the chlorotoluene, and a part of the xylene are employed for taking the milled elastomer into solution while the remainder of the xylene is used to dissolve the organosilicon resin. Otherwise, the procedure is the same as that employed in Example I.

EXAMPLE IV 16.0 parts by weight butadiene-acrylonitrile copolymer
3.0 parts by weight butadiene-styrene copolymer
10.0 parts by weight organosilicon pressure-sensitive adhesive resin
3.0 parts by weight coumarone-indene resin
1.0 part by weight polyterpene
10.0 parts by weight zinc oxide
1.0 part by weight hydrated aluminum oxide
20.0 parts by weight butyl acetate
20.0 parts by weight nitromethane
80.0 parts by weight toluene

EXAMPLE V 10.0 parts by weight butadiene-acrylonitrile copolymer
5.0 parts by weight butadiene-styrene copolymer
18.0 parts by weight organosilicon pressure-sensitive adhesive resin
5.0 parts by weight titanium dioxide
1.0 part by weight hydrated aluminum oxide
10.0 parts by weight chlorotoluene
10.0 parts by weight nitroethane
50.0 parts by weight benzene While the anchor coat described provides for a strong bonding relationship to be developed, such as to enable the use of a pressure-sensitive adhesive having an organosilicon base as a top coat on a film formed of polyethylene or polyethylene derivative, it has been found that an anchoring agent of the type described is also effective to improve the bonding relation between a pressure-sensitive adhesive having an organosilicon base with other conventional films used as a base for pressure-sensitive adhesive tapes, such as are available of the film-forming resinous materials of the type polyvinyl chloride, polyvinyl chloride-vinyl acetate copolymer, polyvinyl butyral, polyvinylidene chloride, regenerated cellulose, cellophane, cellulose acetate, cellulose acetate-butyrate, nitrocellulose and the like. It will be understood that while the advance which has been provided by applicant resides chiefly in the manufacture of a new and improved adhesive tape which enables the use of the combination of a polyethylene or polyethylene derivative film and a pressure-sensitive adhesive having an organosilicon base, invention will also exist in the use of the anchoring coat with other film-forming materials for producing an improved tape employing a top coat formed of an organosilicon pressure-sensitive adhesive.

It will be understood that other changes in the details of formulation of the anchoring coat and application thereof in the treatment of the film to make it more receptive to the pressure-sensitive top coat having an organosilicon base, may be made without departing from the spirit of the invention, especially as defined in the following claims.

I claim:

1. A pressure-sensitive adhesive tape comprising a backing formed of a resinous film-forming material selected from the group consisting of polyethylene, polytetrafluoroethylene, polyethylene terephthalate, and polyethylene derivatives, a pressure-sensitive adhesive coating on the film having an organosilicon polymer resinous base, and an intermediate coat for anchoring the pressure-sensitive adhesive coating to the film, comprising an elastomer selected from the group consisting of a butadiene-acrylonitrile copolymer and a butadiene-acrylonitrile copolymer-butadiene-styrene copolymer wherein, when both the butadiene-acrylonitrile copolymer and the butadiene-styrene copolymer are present, the materials are present in the ratio of 1 part by weight butadiene-acrylonitrile copolymer to 0.2–0.5 part by weight butadiene-styrene copolymer, an organosilicon resinous polymer present in amounts ranging from 1 part by weight elastomer to 0.5–2.0 parts by weight of the organosilicon polymer resin, and a coal tar resin selected from the group consisting of coumarone-indene, coumarone indene-polyterpene, and coumarone indene-polyterpene derivative resins wherein where the coumarone-indene is present with a polyterpene the former is present in substantially greater amounts and in which the coal tar resins are present in the ratio of 1 part by weight elastomer to 0.2–1.0 part by weight of the coal tar resin.

2. A pressure-sensitive adhesive tape as claimed in claim 1, in which the intermediate coat anchoring the pressure-sensitive organosilicon top coat onto the film contains an inert, finely divided pigment present in an amount up to 30 percent by weight of the solids in the anchor coat.

3. A pressure-sensitive adhesive tape as claimed in claim 1 in which the organosilicon resinous components in the top coat and in the anchor coat are in a cured state.

4. A pressure-sensitive adhesive tape as claimed in claim 1 in which the backing film has a thickness ranging from 0.5–10 mils.

5. A pressure-sensitive adhesive tape as claimed in claim 1 in which the anchoring coat is present on the film in coating weights of 8–16 pounds per ream.

6. A pressure-sensitive adhesive tape as claimed in claim 1 in which the anchoring coat is present in coating weights of 8–16 pounds per ream and in which the top coat of the pressure-sensitive organosilicon adhesive is present in coating weights of 20–40 pounds per ream.

7. A pressure-sensitive adhesive tape comprising a backing formed of a resinous film-forming material having a thickness ranging from 0.5–10 mils, a top coat in the form of a pressure-sensitive adhesive having an organosilicon resinous base, and an intermediate coat for anchoring the organosilicon top coat to the backing film, comprising an elastomer selected from the group consisting of a butadiene-acrylonitrile copolymer and a butadiene-acrylonitrile copolymer-butadiene-styrene copolymer wherein, when both the butadiene-acrylonitrile copolymer and the butadiene-styrene copolymer are present, the materials are present in the ratio of 1 part by weight butadiene-acrylonitrile copolymer to 0.2–0.5 part by weight butadiene-styrene copolymer, an organosilicon resinous polymer present in amounts ranging from 1 part by weight elastomer to 0.5–2.0 parts by weight of the organosilicon polymer resin, and a coal tar resin selected from the group consisting of coumarone-indene, coumarone indene-polyterpene, and coumarone indene-polyterpene derivative resins wherein where the coumarone-indene is present with a polyterpene the former is present in substantially greater amounts and in which the coal tar resins are present in the ratio of 1 part by weight elastomer to 0.2–1.0 part by weight of the coal tar resin.

8. A pressure-sensitive adhesive tape comprising a backing film formed of a resinous film-forming material selected from the group consisting of polyethylene, polytetrafluoroethylene, polyethylene terephthalate, and polyethylene derivatives, a top coat of a pressure-sensitive adhesive having an organosilicon polymer resinous base and an intermediate coat for anchoring the pressure-sensitive adhesive top coat onto the backing film, comprising an elastomer selected from the group consisting of butadiene-acrylonitrile copolymer and a butadiene acrylonitrile copolymer-butadiene styrene copolymer wherein when both the butadiene-acrylonitrile copolymer and the butadiene-styrene copolymer are present, the materials are present in the ratio of 1 part by weight butadiene-acrylonitrile copolymer to 0.2–0.5 part by weight butadiene-styrene copolymer, and a pressure-sensitive organosilicon polymer resin present in amounts ranging from 1 part by weight elastomer to 0.5–2.0 parts by weight of organosilicon polymer resin.

9. A pressure-sensitive adhesive tape as claimed in claim 8 in which the anchoring coat contains up to 30 percent by weight of an inert, finely divided pigment uniformly distributed throughout.

10. A pressure-sensitive adhesive tape comprising a backing film formed of a resinous film-forming material selected from the group consisting of polyethylene, polytetrafluoroethylene, polyethylene terephthalate, and polyethylene derivatives, a pressure-sensitive adhesive present as a top coat on the backing film in coating weights of 20–40 pounds per ream and having an organosilicon polymer resinous base and an intermediate coat present in coating weights of from 8–16 pounds per ream for anchoring the pressure-sensitive top coat to the film backing, comprising a butadiene-acrylonitrile copolymer and a butadiene-styrene copolymer present in the ratio of 1 part by weight of the butadiene-acrylonitrile copolymer to 0.2–0.5 part by weight of the butadiene-styrene copolymer, an organosilicon resinous polymer present in the ratio of 1 part by weight of the elastomers to 0.5–2.0 parts by weight of the organosilicon resin, a coumarone-indene resin and a polyterpene resin in which the coumarone-indene is present in amounts greater than the polyterpene and in which the coumarone-indene and polyterpene resins combined are present in amounts ranging from 1 part by weight of the elastomers to 0.2–1.0 part by weight of the coumarone-indene and polyterpene resins.

11. A pressure-sensitive adhesive tape as claimed in claim 10 in which the intermediate anchoring coat contains up to 30 percent by weight based on the amount of solids of a finely divided, inert pigment.

12. The method for treating a film backing formed of a film-forming resinous material to improve the bonding relation of organosilicon pressure-sensitive adhesives thereto, comprising the steps of coating the film with a primer composition comprising an elastomer selected from the group consisting of a butadiene-acrylonitrile copolymer and a butadiene-acrylonitrile copolymer-butadiene-styrene copolymer wherein, when both the butadiene-acrylonitrile copolymer and the butadiene-styrene copolymer are present, the materials are present in the ratio of 1 part by weight butadiene-acrylonitrile copolymer to 0.2–0.5 part by weight butadiene-styrene copolymer, an organo-silicon resinous polymer present in amounts ranging from 1 part by weight elastomer to 0.5–2.0 parts by weight of the organo-silicon polymer resin, and a coal tar resin selected from the group consisting of coumarone-indene, coumarone indene-polyterpene, and coumarone indene-polyterpene derivative resins wherein where the coumarone-indene is present with a polyterpene the former is present in substantially greater amounts and in which the coal tar resins are present in the ratio of 1 part by weight elastomer to 0.2–1.0 part by weight of the coal tar resin, and in which the solids are contained in a solvent system composed of a solvent for the elastomer and a solvent compatible with the elastomer solvent and in which the organo-silicon resinous material is soluble, in which said composition is applied in coating weights of about 8–16 pounds per ream, and then drying the coating on the surface of the film, coating the treated film with a pressure-sensitive adhesive composition having an organo-silicon base and advancing the organo-silicon resinous component to a cured stage.

13. The method of treating a film of polyethylene or polyethylene derivatives to improve the anchorage of organosilicon pressure-sensitive adhesives thereto, comprising the step of coating the film with a composition as claimed in claim 12 in which the solvent system is composed of 10–20 parts by weight of elastomer solvent to 90–80 parts by weight of the solvent for the organo-silicon and in which the composition is applied in coating weights of about 8–16 pounds per ream and then heating the coated film at a temperature within the range of 140–180° F. to dry the coating on the surface of the film, coating the treated film with a pressure-sensitive adhesive composition having an organo-silicon base and advancing the organo-silicon resinous component to a cured stage.

14. The method of treating a film formed of a resinous film-forming material selected from the group consisting of polyethylene, polytetrafluoroethylene, polyethylene terephthalate, and polyethylene derivatives to improve the anchorage of a pressure-sensitive organo-silicon adhesive onto the surface thereof, comprising coating the film with a composition comprising an elastomer selected from the group consisting of a butadiene-acrylonitrile copolymer and a butadiene-acrylonitrile copolymer-butadiene-styrene copolymer wherein when both the butadiene-acrylonitrile copolymer and the butadiene-styrene copolymer are present, the materials are present in the ratio of 1 part by weight butadiene-acrylonitrile copolymer to 0.2–0.5 part by weight of butadiene-styrene copolymer, an organo-silicon polymer resin present in the ratio of 1 part by weight of elastomer to 0.5–2.0 parts by weight of the organo-silicon polymer resin, and in which the materials are contained in a solvent system composed of the combination of a solvent for the milled elastomers and a solvent compatible with the elastomer solvent and in which the organo-silicon is soluble, and in which the materials are present in the coating composition in amounts to provide 15–45 percent by weight solids and then drying the composition on the surface of the film, coating the treated film with a pressure-sensitive adhesive composition having an organo-silicon base and advancing the organo-silicon resinous component to a cured stage.

15. The method of preparing a pressure-sensitive adhesive tape having good dielectric properties and which retains its stability and flexibility over wide temperature ranges, comprising coating a backing film formed of a resinous film-forming material selected from the group consisting of polyethylene, polytetrafluoroethylene, polyethylene terephthalate, and polyethylene derivatives with an anchoring composition comprising an elastomer selected from the group consisting of a butadiene-acrylonitrile copolymer and a butadiene-acrylonitrile copolymer-butadiene-styrene copolymer wherein, when both the butadiene-acrylonitrile copolymer and the butadiene-styrene copolymer are present, the materials are present in the ratio of 1 part by weight butadiene-acrylonitrile copolymer to 0.2–0.5 part by weight butadiene-styrene copolymer, an organo-silicon resinous polymer present in amounts ranging from 1 part by weight elastomer to 0.5–2.0 parts by weight of the organo-silicon polymer resin, and a coal tar resin selected from the group consisting of coumarone-indene, coumarone indene-polyterpene, and coumarone indene-polyterpene derivative resins wherein where the coumarone-indene is present with a polyterpene the former is present in substantially greater amounts and in which the coal tar resins are present in the ratio of 1 part by weight elastomer to 0.2–1.0 part by weight of the coal tar resin, and in which the solids are contained in a solvent system composed of a solvent for the elastomer and a solvent compatible with the elastomer solvent and in which the organo-silicon resinous material is soluble, drying the anchoring coat on the surface of the film and then coating the treated film with a pressure-sensitive adhesive composition having an organosilicon base, drying the top coat and then heating the composite structure at a temperature ranging from 225–350° F. to advance the organosilicon resinous components in the anchoring coat and in the pressure-sensitive top coat to a cured state.

References Cited in the file of this patent

UNITED STATES PATENTS

| | | |
|---|---|---|
| 2,381,248 | Bascom | Aug. 7, 1945 |
| 2,506,320 | Vail | May 2, 1950 |
| 2,673,824 | Biefeld et al. | Mar. 30, 1954 |
| 2,720,004 | Phreaner | Oct. 11, 1955 |
| 2,750,316 | Bemmels | June 12, 1956 |
| 2,790,736 | McLaughlin et al. | Apr. 30, 1957 |